United States Patent [19]

Moro et al.

[11] Patent Number: 4,548,483

[45] Date of Patent: Oct. 22, 1985

[54] AUTOMOBILE DOOR MIRROR DEVICE HAVING A BUFFER MECHANISM

[75] Inventors: Shuji Moro, Hiratsuka; Michio Tenmaya, Yono, both of Japan

[73] Assignees: Ichikoh Industries Limited; Honda Motor Co., Ltd., both of Tokyo, Japan

[21] Appl. No.: 513,860

[22] Filed: Jul. 14, 1983

[30] Foreign Application Priority Data

Jul. 19, 1982 [JP] Japan .................. 57-108154[U]
Jul. 19, 1982 [JP] Japan .................. 57-108155[U]

[51] Int. Cl.⁴ ............................................. G02B 7/18
[52] U.S. Cl. .................................... 350/635; 248/484; 248/549; 248/900
[58] Field of Search .............. 350/307, 635; 248/900, 248/549, 548, 484

[56] References Cited

FOREIGN PATENT DOCUMENTS

| 2647731 | 4/1978 | Fed. Rep. of Germany | 350/635 |
| 2857558 | 7/1980 | Fed. Rep. of Germany | 350/307 |
| 2857557 | 7/1980 | Fed. Rep. of Germany | 350/307 |
| 2856612 | 7/1980 | Fed. Rep. of Germany | . |
| 2857556 | 8/1980 | Fed. Rep. of Germany | 350/307 |
| 3001906 | 7/1981 | Fed. Rep. of Germany | . |
| 7734 | 1/1982 | Japan | 350/635 |

*Primary Examiner*—Jon W. Henry
*Attorney, Agent, or Firm*—Cushman, Darby & Cushman

[57] ABSTRACT

A door mirror device for automobiles, wherein a mirror housing supporting a mirror is urgingly held by a coil spring to a mirror base fixed to a vehicle body. Their respective end portions which are held are provided with marginal portions which are closely attached to each other throughout their respective entire areas. On the inside of the respective marginal portions of the mirror housing and the mirror base, a plurality of projections extend into each other's inside portion in staggered fashion one above the other, so that when the mirror housing is tilted, the respective opposing projections are engaged with each other to prevent any vertical displacement of the mirror housing, and that when an applied external force is removed, the mirror housing returns to its initial position without a fail.

3 Claims, 5 Drawing Figures

AUTOMOBILE DOOR MIRROR DEVICE HAVING A BUFFER MECHANISM

BACKGROUND OF THE INVENTION (a) Field of the Invention

The present invention relates to a door mirror device for automobiles, and more particularly it pertains to a door mirror device having a buffer mechanism.

(b) Description of the Prior Art

A door mirror device equipped with a buffer mechanism is installed on a door of an automobile near a corner of the front wind shield frame. Tilting of the mirror face of such a mirror device is controlled either by manual operation, or by remote control by a driver on the inside of the compartment of the automobile. Such a known mirror device functions so that in case a great impact is applied externally to the mirror device when contacted by an external object, the mirror housing assigned to support the mirror body is tilted relative to the vehicle body to thereby reduce the damage of the external object which has contacted the mirror device and also to prevent the mirror device itself from being destroyed. Such functions of the mirror device is accomplished by the arrangement that the mirror housing is resiliently held by a spring means onto the mirror base portion which, in turn, is fixed to the vehicle body. This known mirror device is so arranged that, in case a powerful external force is applied to the mirror housing, it will tilt either in the forward direction or backward direction in accordance with the direction of the force which has been applied.

For example, West German Laid-open Utility Model Publication No. 2838465 (laid open on Mar. 13, 1980) discloses a remote control type door mirror provided with such a buffer mechanism as mentioned above.

In the door mirror device of the type as mentioned above, a mirror housing to which a mirror is fixed is engaged, being energized by a coil spring, with a mirror base which, in turn, is fixed to a door frame of the automobile body. At the engaging site of the mirror base, there are formed projections extending toward the mirror housing. And, on the mirror housing side which faces said engaging site, there is formed recesses for engaging said projections. By the engagement of these projections in the recesses, the positioning of the mirror housing is attained. In case, however, the mirror housing is tilted, it will be noted that, although the movement of this mirror housing toward the mirror base is restricted by the energized force of the coil spring, the projections become disengaged from the recesses, causing the positioning in the vertical direction to be eliminated. As a result, there is the fear that the mirror housing is displaced vertically relative to the mirror base. There is, however, a problem in this prior art mirror device that, even in case this vertical displacement has removed the external force which had been applied to the mirror housing, this latter mirror housing will no longer be able to return to its initial position by the energized force of the coil spring.

SUMMARY OF THE INVENTION

It is, therefore, an object of the present invention to provide a door mirror device for automobiles which is arranged so that, even when the mirror housing has been tilted by being subjected to a strong external force, its engagement with the mirror base is maintained to insure that the tilted mirror housing can reassume its initial position without fail.

Another object of the present invention is to provide a door mirror device for automobiles which is arranged so that, even when the mirror housing is subjected to vertical external force, the mirror housing will not make any vertical displacement relative to its mirror base.

According to the present invention, there is provided a door mirror device for automobiles which is arranged to comprise a mirror housing pivotably supporting a mirror body and a mirror base which is fixed to the vehicle body for supporting said mirror housing, there being provided an elastic member to intervene between said mirror housing and said mirror base for coupling these two members in such way that said mirror housing can be held relative to said mirror base and that said mirror housing can tilt forward and backward about a fulcrum which is a portion of either a front side or a rear side of said mirror housing relative to a direction of advancement of a vehicle to which said mirror device is secured, said mirror housing having an end portion for supporting this mirror housing, said mirror base having an end portion opposing said end portion of the mirror housing, these respective end portions having their own marginal portions which engage each other for establishing close contact throughout their entire surfaces, there being provided, on the inside of respective end portions of said mirror housing and said mirror base locating adjacent to the marginal portions of said end portions, a plurality of projections to extend to oppose their corresponding projections in staggering fashion one above the other to engage on the inside of the respective opposing end portions, to thereby inhibit the mirror housing to detach from the mirror base.

DETAILED DESCRIPTION OF THE PREFERRED EMBODIMENT

Figure 1:
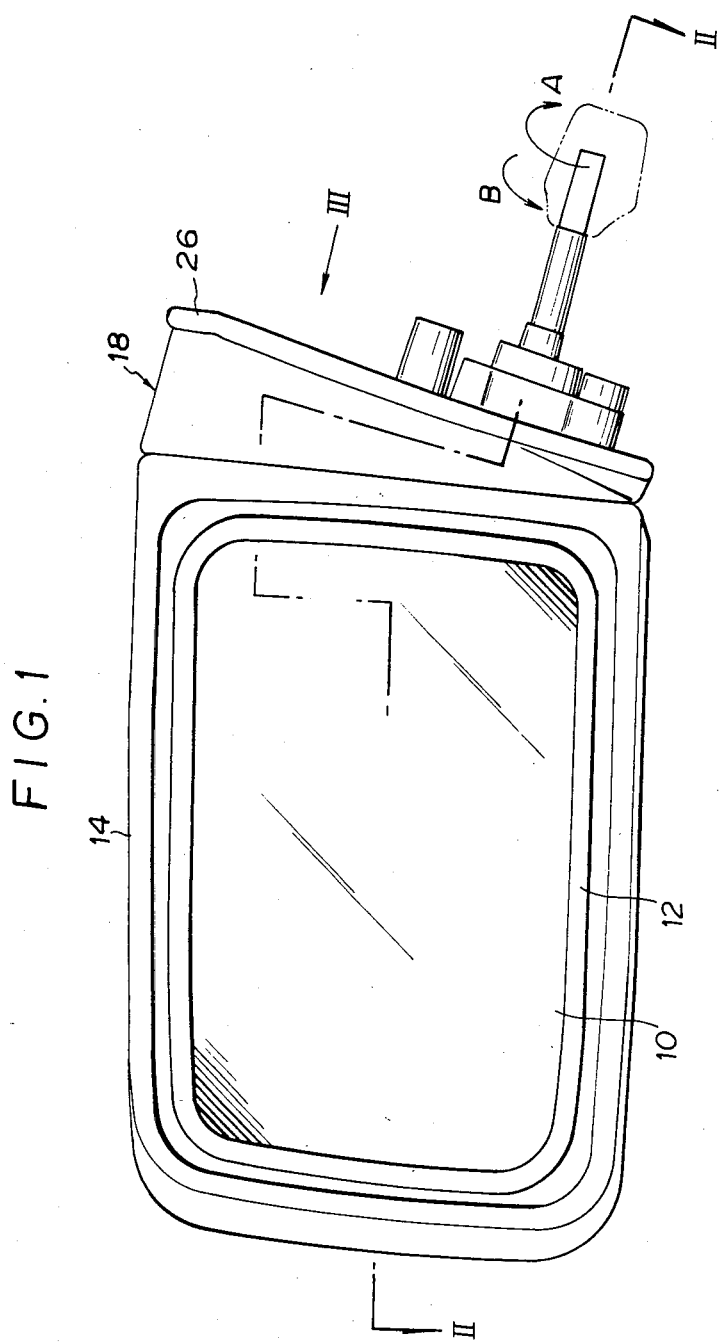
FIG. 1 is a diagrammatic front view of a door mirror device for automobiles according to an embodiment of the present invention.
Figure 2:
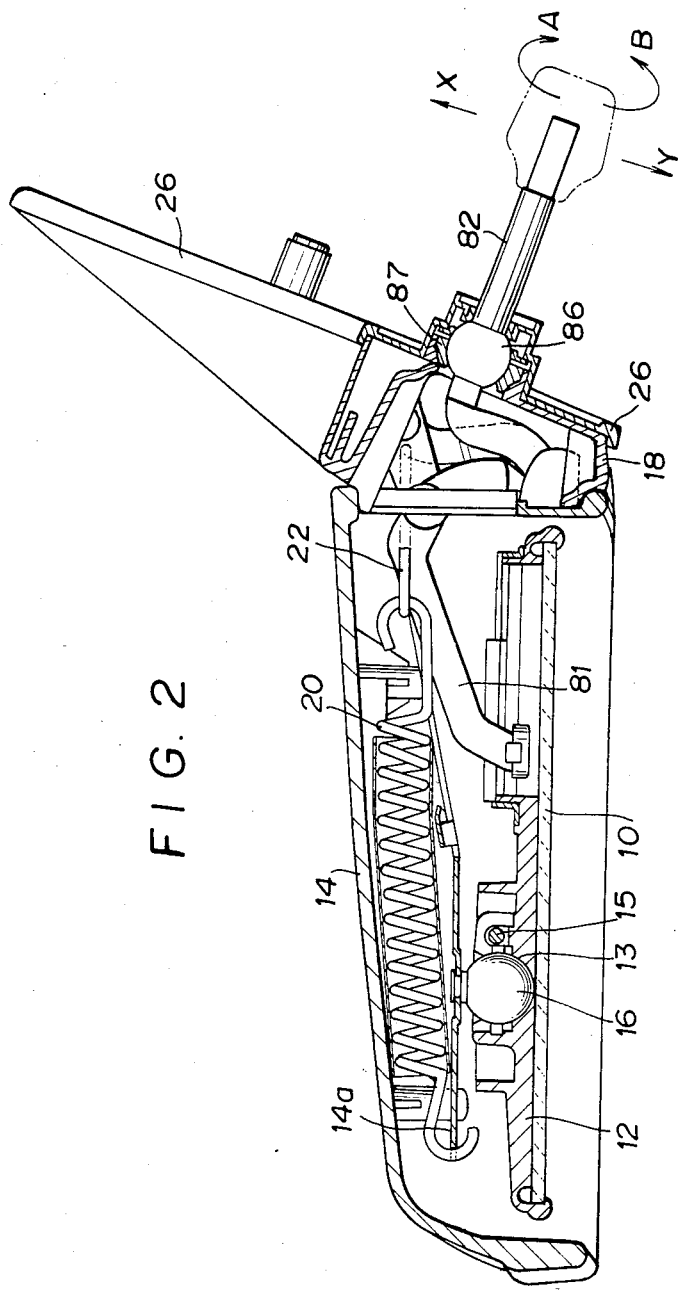
FIG. 2 is a diagrammatic sectional view taken along the line II—II in FIG. 1.
Figure 3:
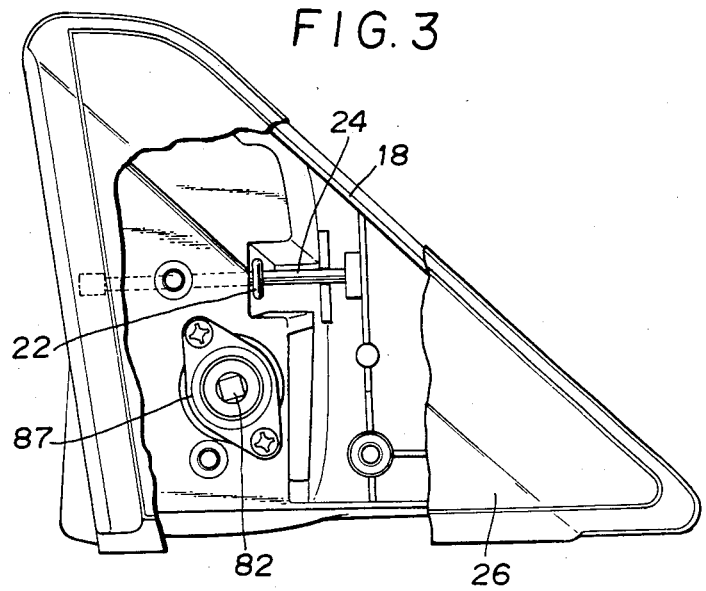
FIG. 3 is a diagrammatic bottom view, partly broken away, as viewed in the direction of an arrow III.
Figure 5:
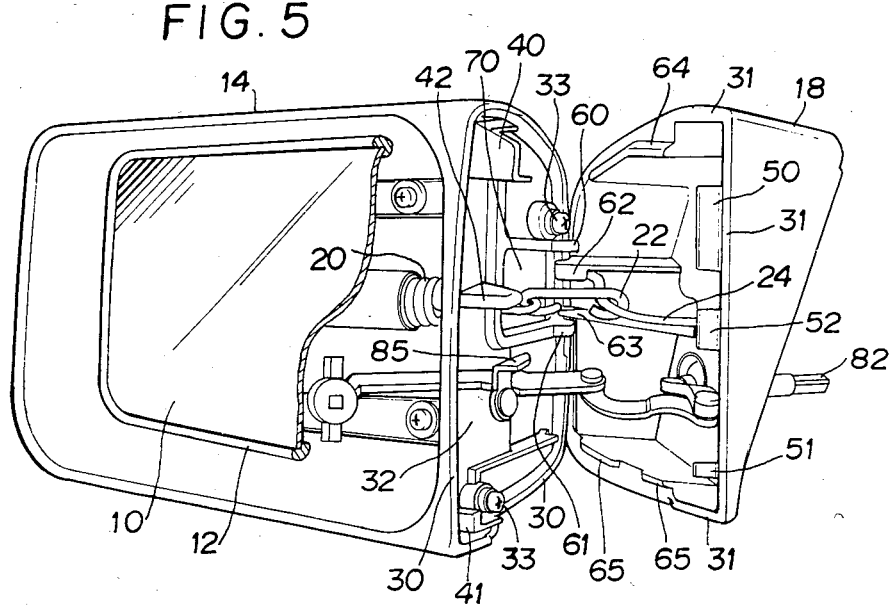
FIG. 5 is a diagrammatic illustration showing the state of engagement of the tilted mirror housing with the mirror base.
Figure 4:
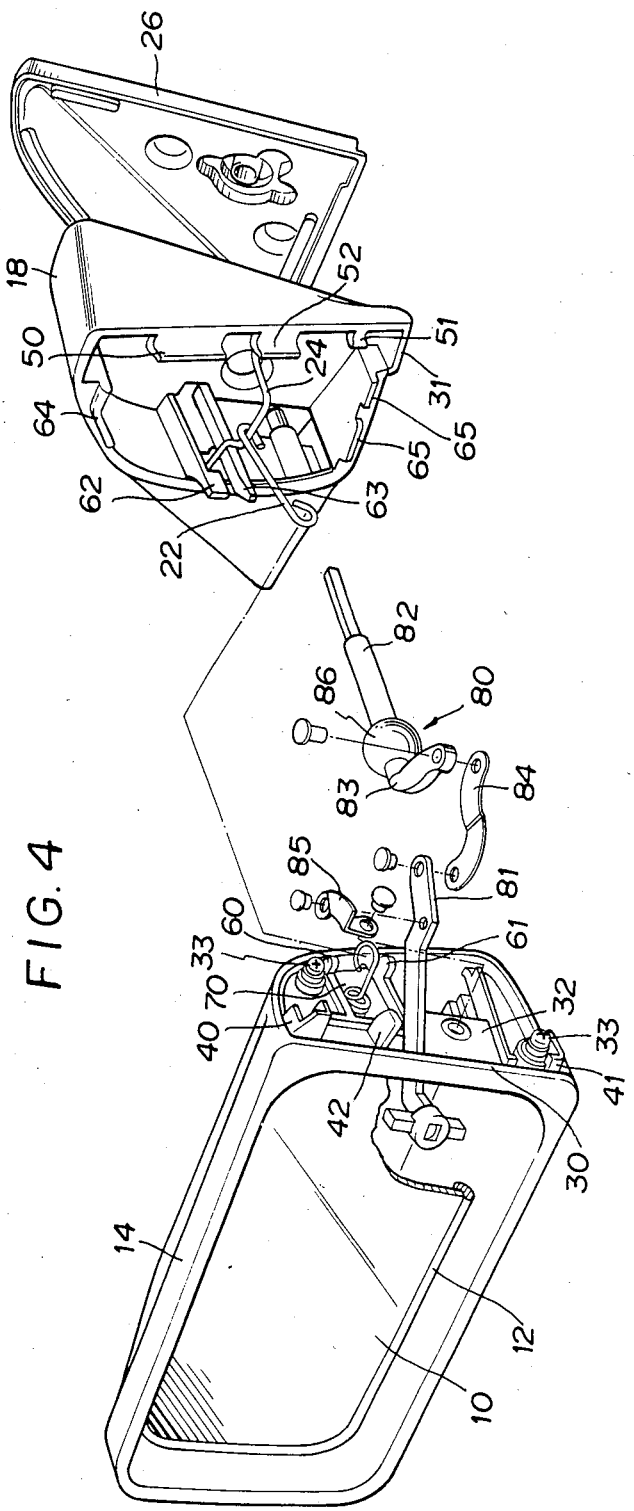
FIG. 4 is a diagrammatic exploded perspective view of the device.

Description will hereunder be made of an embodiment of the door mirror device for automobiles of the present invention by referring to the accompanying drawings.

FIGS. 1 to 5 illustrate an instance wherein the present invention is applied to a door mirror device of the remote-controlling type. The illustrated mirror device, as a whole, is secured to the door panel on the left side of an automobile relative to the direction of advancement of the vehicle. A mirror 10 is fixed to a mirror body 12 which, in turn, is pivotably supported within a mirror housing 14. On the rear side of the mirror body 12 is formed a spherical seat 13 into which is fitted a spherical member 16 which, in turn, is fixed to a supporting plate in the mirror housing 14. The spherical seat 13 is formed by two separate portions and they are arranged so as to be fastened together by a screw 15. By adjusting the fastening force of this screw 15, the torgue of the spherical member 16 relative to the spherical seat 13 can be adjusted accordingly. Thus, the mirror 10 is able to pivot vertically as well as sideways about the spherical seat 13. The mirror housing is formed so that its rear side which faces the direction of advancement of the vehicle has a curved face. The end portion of the mirror housing is resiliently held onto a mirror base 18 formed by a light metal diecast such as aluminum and fixed to the door panel of the vehicle by the elastic force of a coil spring 20. A cover 26 made of rubber is fitted onto the bottom face of the mirror base 18. One end of the coil spring 20 is anchored to a supporting plate 14a provided within the mirror housing, and the other end thereof engages one end of a coupling member 22 whose other end, in turn, is anchored to a bar 24 having both ends fixed to the mirror base 18. The mirror housing 14 has, at its one end, a marginal portion 30. Also, at an end portion of the mirror base 18 facing said end portion of the mirror housing 14, there is formed a marginal portion 31. These two marginal portions are so formed that they are closely attached to each other throughout their entire surfaces when these two marginal portions are brought into engagement with each other by the coil spring 20. And, in that region of the end portion of the mirror housing 14 which is surrounded by its marginal portion 30, a plate-like member 32 is fixed by an attachment screw 33 which is formed by a light metal diecast. On the plate-like member 32 are formed protrusions 40, 41 and 42 on the inside of the end portion of the mirror housing adjacent to the marginal portion 30 where the mirror is provided. The protrusions 40 and 41 are disposed in the vicinity of the corners of the end portion of the mirror housing, while the protrusion 42 is located in between the other two protrusions. These protrusions 40, 41 and 42 extend, respectively, from the end portion of the mirror housing toward the inside of its opposing end portion of the mirror base 18. Similarly, projections 50, 51 and 52 are provided on the corresponding end portion of the mirror base 18 to extend toward the inside of the opposing end portion of the mirror housing. Those protrusions 40 and 41 of the mirror housing 14 engage on the inside portion located near the corner of the marginal portion 31 of the opposing mirror base 18, whereas the protrusion 42 engages on the inside of the corresponding marginal portion of the opposing mirror base 18. A projection 50 which is formed on the mirror base 18, on the other hand, engages, at its upper end portion, the lower end portion of the protrusion 40 of the mirror housing, and also engages on an inside portion of the marginal portion of the opposing mirror housing. The projection 52 engages, at its upper end portion, the lower end portion of the protrusion 42, and also engages on an inside portion of the marginal portion of the opposing mirror housing. Furthermore, the projection 51 engages, at its lower end portion, the upper end portion of the protrusion 41, and also engages on an inside portion of the marginal portion of the opposing mirror housing. On the plate-like member 32, on the other hand, there are formed lugs or projections 60 and 61 located adjacent to the marginal portion which is located on the rear face of the end portion of the mirror housing, and these lugs extend toward the inside of the marginal portion 31 of the opposing mirror base 18, to enage on the inside portion thereof. The protrusions 40, 41 and 42 and the lugs 60 and 61 are formed integrally on the plate-like member 32 which is made with a light metal diecast such as aluminum. It is, however, possible also to simultaneously form the plate-like member 32 including these protrusions and lugs of the mirror housing. It is desirable to form the mirror housing with a synthetic resin and to form the end portion of the mirror housing with a light metal diecast such as aluminum. Also, on the end portion of the mirror base 18, there are formed two lugs or projections 62 and 63 to extend so as to be disposed between the lugs 60 and 61 of the mirror housing, and they engage on an inside portion of the end portion of the mirror housing. An aperture 70 is formed locally in the plate-like member 32 which is sandwiched between the lugs 60 and 61. The lugs 62 and 63 enter into this aperture 70 to engage the end portion thereof. The engaging portions of the lugs 62 and 63 are formed to have tapered shapes, respectively, to provide guiding functions and also to have some clearance. A part of the marginal portion locating between the lugs 60 and 61, i.e. the most intensively curved portion, serves as a fulcrum for the mirror housing when this latter is tilted toward its rear side, i.e. in the direction of advancement of the vehicle. The lugs 62 and 63 engage the end portion of the aperture at a position sandwiching this fulcrum and in the state that they are separated apart from the lugs 60 and 61, respectively. The position of this fulcrum can vary depending on the shape of a given curved face of the rear side of the mirror housing. However, because of the arrangement that the coupling member 22 which is connected to one end of the coil spring to be connected to the bar 24 having its both ends fixed to the mirror base passes through said aperture 70, the fulcrum in this embodiment lies at a position somewhat upwardly offset from the center of the marginal portion of the mirror housing. Also, because the rear side of the mirror housing is formed to have a curved surface, the lugs 60 and 61 will move somewhat upwardly, forming an arcuate shape, about the fulcrum when the mirror housing is tilted in the direction of advancement of the vehicle, so that the lugs 62 and 63 are formed to have such lengths as will insure that these lugs will contact the lugs 60 and 61, respectively, but that there will be brought about no disengagement of the mirror housing from the mirror base. Furthermore, at upper and lower positions on the inside of the marginal portions of the mirror base 18 (FIG. 4), there are formed tapered projections 64 and 65, 65 so as to engage on the corresponding inside of the marginal portion of the opposing mirror housing.

In this embodiment, the means for tilting the mirror face is comprised of a link mechanism 80 including an arm member having one end extending into the compartment of the vehicle. This link mechanism comprises a first link member 81 having one end slidably secured to the rear side of the mirror body, and a second link member 84 rotatably connected to one end of a third link member 83 having one end rotatably connected to the other end of the first link member 81 and its other end including an operating arm 82. A part of the first link member 81 is rotatably secured to a supporting member 85 fixed to the plate-like member 32 of the end portion of the mirror housing. Also, a spherical portion 86 is formed on the third link member 83, and this spherical portion is supported pivotably in a receiving seat 87 which is formed on a mirror base member. The other end of the third link member 83 extends into the compartment of the vehicle to form the operating arm 82. A knob which is shown by an imaginary line in FIG. 1 is fixed to the foremost end of this operating arm 82.

By means of these respective link members, the mirror face can be tilted about a horizontal axis and about a vertical axis. As the knob is turned either in the direction of an arrow A or in the direction of an arrow B, the mirror face will tilt about the horizontal axis, whereas when the knob is moved in the direction of an arrow X or an arrow Y, the mirror face will tilt about the vertical axis. Needless to say, the lengths of the abovesaid link members are selected so that, when the mirror housing 14 is tilted, these members will not interfere with, either one of the mirror housing and the mirror base. It is also possible to arrange, without using the abovesaid link mechanism 80, a driving motor and an advancing and retreating rod which abuts the rear side of the mirror body within the mirror housing, to effect a tilting of the mirror face by actuating the driving motor from within the compartment.

In the door mirror device for automobiles according to the present invention, in case the mirror housing is subjected to a strong external force and tilts in the direction of advancement of the vehicle, this tilting takes place about a fulcrum which is that particular portion of the end portion of the mirror housing which is positioned between the lugs 60 and 61 which are provided on the rear side of the mirror housing. Concurrently therewith, the lugs 60 and 61 are disengaged from the inside of the marginal portion of the mirror base, and both the lugs 64 and 65 of the mirror base are released from their engagement with the inside of the marginal portion of the mirror housing, whereas the foremost ends of the lugs 62 and 63 are positioned within the aperture of the end portion of the mirror housing and are maintained in their positions of engaging the end portion of the aperture. Before the mirror housing tilts, the lug 63 is not in engagement with the lug 61, but when the mirror housing tilts, the lug 63 is brought into engagement with this lug 61. And, when the mirror housing is subjected to a downward external force while the mirror housing is in its tilted position or when it has completed its tilting, the foremost end of the lug 62 remains to be within the aperture, and concurrently engages the lug 60. When the mirror housing receives an upward external force, the tip of the lug 63 still remains inside the aperture, and it engages the lug 61. Accordingly, the mirror housing will not develop detachment from the mirror base, and after the removal of the applied external force, the mirror housing is able to be restored unfailingly to its initial position by the elastic force of the coil spring.

On the other hand, in case the mirror housing tilts in a direction opposite to the direction of advancement of the vehicle, the mirror housing will tilt about the fulcrum which is the marginal portion located on that side of the mirror housing where the mirror face is disposed, while the abovesaid marginal portion is being held in its state of being closely attached with the marginal portion of the opposing mirror base by the elastic force of the coil spring. At such time, the lugs 60 and 61 as well as the lugs 62 and 63 are released from their engagement with the inside of the marginal portion of the mirror base and with the end portion of the aperture, respectively. Also, the protrusions 40 and 41 are rendered to a state that they are about to detach from the inside of their opposing marginal portion of the mirror base. In case a downward external force is applied to the mirror housing when it is tilted or in its state that the tilting has completed, the protrusion 40 is in engagement with the upper end of the projection 50, while the protrusion 42 is in engagement with the upper end of the projection 52, whereas the protrusion 41 is in engagement with the lower end of the projection 51, so that the mirror housing will not develop a detachment from the mirror base. After the applied external force has been removed, the mirror housing becomes able to return to its initial position without a fail by the elastic force of the coil spring. Furthermore, in this door mirror device, there is no fear that the end portions of the mirror housing and of the mirror base including a plurality of protrusions or projections will wear out or crack easily, because the respective end portions are formed by rigid materials of light metal diecast, such as aluminum.

A preferred embodiment of the door mirror device for automobiles according to the present invention has been described above. It will be self-evident from the foregoing description that many modifications and changes of the present invention may be made without departing from the spirit and scope of the present invention which are defined by the appending claims.

What is claimed is:

1. A door mirror mount for automobiles of the type having a mirror housing, a mirror mounted on said housing and a base means in engagement with said housing for coupling said housing to an automobile through coupling means such that said housing is pivotable relative to said base against the force of spring means operating between said housing and said base means about two spaced fulcrums each corresponding respectively to forward and backward bending of said housing relative to said base means and the front and back of the automobile, said housing and said base means each having ends with each end having a peripheral edge, said peripheral edges of said housing and said base means being formed to smoothly engage one another without any external interruption, and adjacent thereto an interior surface, said housing having, extending from adjacent said respective interior surface of said edge of said housing, a first projection set including a plurality of projections defining a portionof one of said fulcrums to thereby locate one of said fulcrums, and a second projection set including a plurality of other projections defining a portion of the other of said fulcrums thereby locating said other fulcrum, said base means having, extending from adjacent said respective interior surface of said edge of said base means a first projection set and a second projection set each set including at least two projections positioned such that when said edges of said housing and base means are engaged, said projections of said first sets of said housing and said base means and said projections of said second sets will be interspersed such that relative movement in a direction parallel to said one fulcrum and in a direction parallel to said other fulcrum will be prevented at least while said housing is moved from a rest position to a pivotted position, about one of said fulcrums and is returned to said rest position.

2. The door mirror as claimed in claim 1 wherein said mirror housing and base means are die cast with said respective projections being integral with said respective housing and base means.

3. The door mirror as claimed in claim 1 wherein selected ones of said projections of said sets are arcuately curved to facilitate pivoting of said housing relative to said base means.

* * * * *